United States Patent [19]

Guida

[11] Patent Number: 4,866,509

[45] Date of Patent: Sep. 12, 1989

[54] SYSTEM FOR ADAPTIVELY GENERATING SIGNAL IN ALTERNATE FORMATS AS FOR AN EDTV SYSTEM

[75] Inventor: Allan A. Guida, East Windsor, N.J.

[73] Assignee: General Electric Company, Princeton, N.J.

[21] Appl. No.: 238,238

[22] Filed: Aug. 30, 1988

[51] Int. Cl.[4] .......................................... H04N 11/20
[52] U.S. Cl. ...................................... 358/12; 358/11; 358/141
[58] Field of Search .................... 358/11, 12, 141, 140

[56] References Cited

U.S. PATENT DOCUMENTS

| | | | |
|---|---|---|---|
| 3,200,195 | 8/1965 | Davies et al. | 358/12 |
| 4,402,013 | 8/1983 | Wargo | 358/160 |
| 4,583,113 | 4/1986 | Pritchard | 358/12 X |
| 4,605,950 | 8/1986 | Goldberg et al. | 358/12 X |
| 4,621,286 | 11/1986 | Reitmeier et al. | 358/141 |
| 4,631,574 | 12/1986 | LoCicero et al. | 358/12 |
| 4,661,850 | 4/1987 | Strolle et al. | 358/12 X |
| 4,677,483 | 6/1987 | Dischert et al. | 358/11 X |
| 4,694,338 | 9/1987 | Tsinberg | 358/141 |

FOREIGN PATENT DOCUMENTS 2138238 10/1984 United Kingdom .

OTHER PUBLICATIONS

Fukinuki et al, "Extended Definition TV Fully Compatible with Existing Standards", Aug. 1984, pp. 948–953.

Iredale, R. J., "A Proposal for a New High-Definition NTSC Broadcast Protocol", Feb. 1987, pp. 14–27.

Tsinberg, M., "ENTSC Two-Channel Compatible HDTV System", Aug. 1987, pp. 146–153.

Sarenoff, David, "Advanced Compatible Television", Sep. 1988, pp. 1–44.

M. Isnardi et al., "Decoding Issues in ACTV System" IEEE Transaction on Consumer Electronics; vol. 34, No. 1, Feb. 1988, pp. 111–120.

Primary Examiner—James J. Groody
Assistant Examiner—E. Anne Faris
Attorney, Agent, or Firm—Joseph S. Tripoli; Eric P. Herrmann

[57] ABSTRACT

A video signal generating system develops an encoded video signal representing less than all of the video information. Auxiliary signal generating circuitry develops a pair of auxiliary signals representing in part the remaining video information. A first of the pair of auxiliary signals includes relatively high fidelity signal but with limited bandwidth. The second auxiliary signal includes relatively low fidelity information but has an effective higher bandwidth. Depending upon the information density of the auxiliary information, the first and second auxiliary signals are selected to produce an auxiliary output signal which is combined with the encoded video signal for transmission. A receiver responsive to the transmitted signal separates the video and auxiliary signals. The video and auxiliary signals are decoded and used to generate enhanced display images.

14 Claims, 3 Drawing Sheets

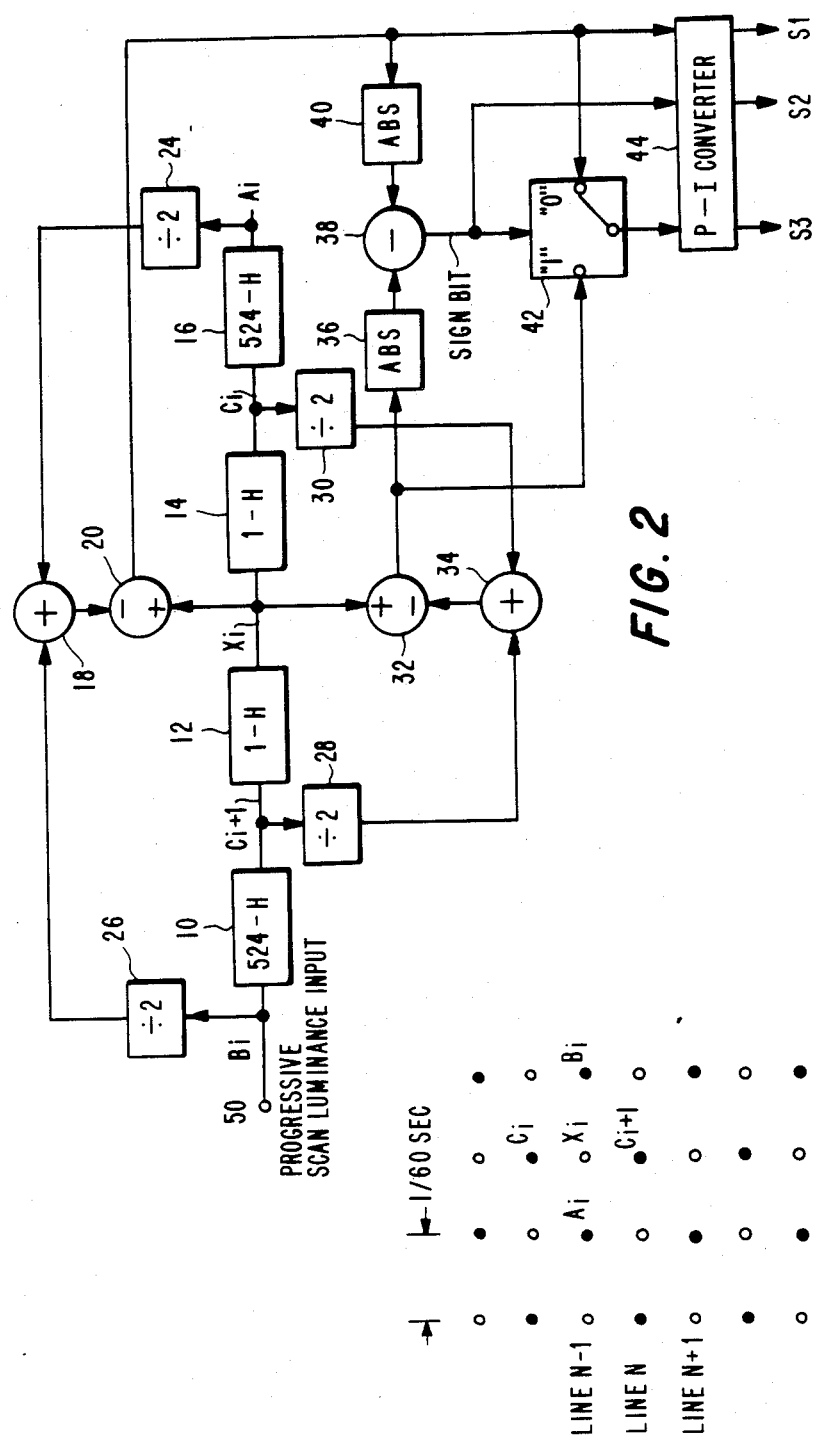

SYSTEM FOR ADAPTIVELY GENERATING SIGNAL IN ALTERNATE FORMATS AS FOR AN EDTV SYSTEM

This invention relates to a system for changing the form of a signal to be transmitted, responsive to a feature of the signal.

BACKGROUND OF THE INVENTION

The invention will be described in the environment of an enhanced definition television (EDTV) system, however it is not to be construed as limited to this application.

The television industry is striving to improve the quality of displayed television images. To this end several EDTV and high definition television (HDTV) systems have been proposed. The EDTV systems develop broadcast signals which are compatible for reception by existing standard receivers, but contain auxiliary signal components which may be utilized by EDTV receivers to generate enhanced images. The HDTV systems generate broadcast signals for producing high resolution, wide aspect ratio images on HDTV receivers, which signals are not compatible for reception by current day "standard" receivers. In both the EDTV and HDTV systems, in general it is necessary, either for regulatory reasons or pragmatic reasons to encode the original source image signals in a frequency spectrum of bandwidth narrower than the bandwidth of the source signals. Typically the encoding formats are established according to some statistically average signal feature whereby for the majority of transmitted images the respective receiver will be capable of faithfully reproducing the original image. However for certain images, for example the bandwidth of a particular encoded signal component may be insufficient and result in a poorer quality reproduced image. As an example consider the EDTV system described by Isnardi et al., entitled "Decoding Issues In the ACTV System", IEEE Transactions on Consumer Electronics, Vol. 34, No. 1, February 1988, pp. 111–120, also described in U.S. patent application Ser. No. 139,340, filed 29 December 1987 and incorporated herein by reference. The Isnardi et al. system develops an auxiliary signal component designated the vertical-temporal (V-T) helper signal, to aid the receiver in converting interlace scan signals to progressive scan signals.

The encoder of the Isnardi et al. system utilizes a progressive scan source of image signals and generates an interlace scan broadcast signal Nominally video signals contain significant information redundancy Due to this redundancy, receivers can be designed to autonomously convert interlace scan signals back to progressive scan signals fairly accurately. For images representing moving objects, the amount of redundancy diminishes and the ability of a receiver to autonomously convert interlace scan signals to progressive scan signals is impaired because the receiver lacks sufficient information. The V-T helper signal which has a variable amplitude provides this information. Since the helper signal represents only the receivers prediction error, it contains relatively low average energy for a majority of images. The bandwidth of the helper signal is limited to 750 KH2 to facilitate encoding, which bandwidth is sufficient to provide a helper signal with adequate information to reconstruct a majority of images. However the bandwidth is too narrow to provide sufficient helper information for images containing a high degree of detail and images which are panned. Consequently, the system performance may be deficient for a sequence of a certain class of images.

SUMMARY OF THE INVENTION

The present invention ameliorates the deficiencies of bandwidth limitations by providing for alternate signal formats wherein a first format sacrifices bandwidth for signal fidelity and a second format sacrifices signal fidelity for effective broader bandwidth. In one embodiment of the invention, included in the transmitting end of a signal processing system, first and second signal encoders respond to a signal component of interest. The first encoder generates an encoded auxiliary signal in a first format having relatively high fidelity over a given bandwidth. The second encoder generates an encoded auxiliary signal in a second format which is coarsely quantized and data compressed to provide an effective wider bandwidth. A detector, responsive to the signal component, determines the energy or information density of the component, and provides auxiliary signal from the first and second encoders to transmitting circuitry for low and high energy density signals respectively.

In a further embodiment, included in the receiving end of a signal processing system, first and second decoders for decoding signal encoded in said first and second formats respectively are arranged to process the received auxiliary signal. A detector responsive to the received auxiliary signal determines the format of the received signal and provides signal from the appropriate decoder to further processing circuit.

BRIEF DESCRIPTION OF THE DRAWINGS

FIG. 1 is a dot pattern representing in part, horizontal lines of progressively scanned video signal from several fields/frames, useful in describing the invention.

FIG. 2 is a block diagram of circuitry for generating a progressive scan helper signal.

DETAILED DESCRIPTION

Referring to FIG. 1 each column of dots represents a portion of the number of horizontal lines of video signal scanned in 1/60th of a second (NTSC format). For purposes of this description, the lines scanned in 1/60th of a second (one column of dots) whether in interlace scan form or progressive scan form, will be designated a field interval. Thus FIG. 1 represents a portion of four fields designate $F_{N-1}$ to $F_{N+2}$. A field including both the filled dots and the open circles represents a progressive scan image. A field including only the filled dots represents one field of a frame of interlace scanned image.

In the system described in the aforementioned Isnardi et al. reference, at the transmitting end of the system, video signal from a progressive scan source is converted to interlace form for broadcasting. In effect this is accomplished by deleting alternate lines in alternate fields. With reference to FIG. 1 the lines represented by circles are deleted and the lines represented by solid dots are transmitted. At the receiver the deleted lines are reconstructed to regenerate a progressive scan video signal. To aid the receiver in reconstructing the deleted lines a helper signal is generated at the broadcast end and transmitted with the broadcast signal. The helper signal is an interlace signal and includes a predictive error that the receiver would make in autonomously reconstructing the moving lines. For example the receiver will have information corresponding to lines $A_i$ and $B_i$ from fields $F_N$ and $F_{N+2}$ respectively. Without a helper signal the receivers could reconstruct the missing line $x_i$ according to the algorithm $x_i=(A_i+B_i)/2$ where $x_i$, $A_i$ and $B_i$ represent signal amplitudes. However the calculated value $x_i$ may be significantly in error. To preclude such error, the Isnardi et al. system generates a helper signal at the transmitter according to the relation $$helper = x_i - (A_i+B_i)/2 \quad (1)$$

At the receiver the helper signal is added to the respective values $(A_i+B_i)/2$ to accurately generate the missing lines. Because of the high level of redundancy in most images and sequences of images the helper signal is zero valued much of the time and therefore can be transmitted with relatively narrow bandwidth. Based on this assumption, the Isnardi et al. system band limits the helper signal to 750 kHz and transmits it with the encoded luma/chroma components by quadrature modulation of the picture carrier In order to prevent interference with the encoded luma/chroma components, the helper signal is amplitude compressed before modulation. The compression however has the undesired effect of reducing the signal-to-noise ratio of the helper signal at the receiver. In the following description, a first embodiment, with reference to FIG. 3, overcomes the bandwidth limitations on the helper signal, and a second embodiment, with reference to FIG. 4 overcomes both the bandwidth and signal-to-noise limitations.

Figure 3:
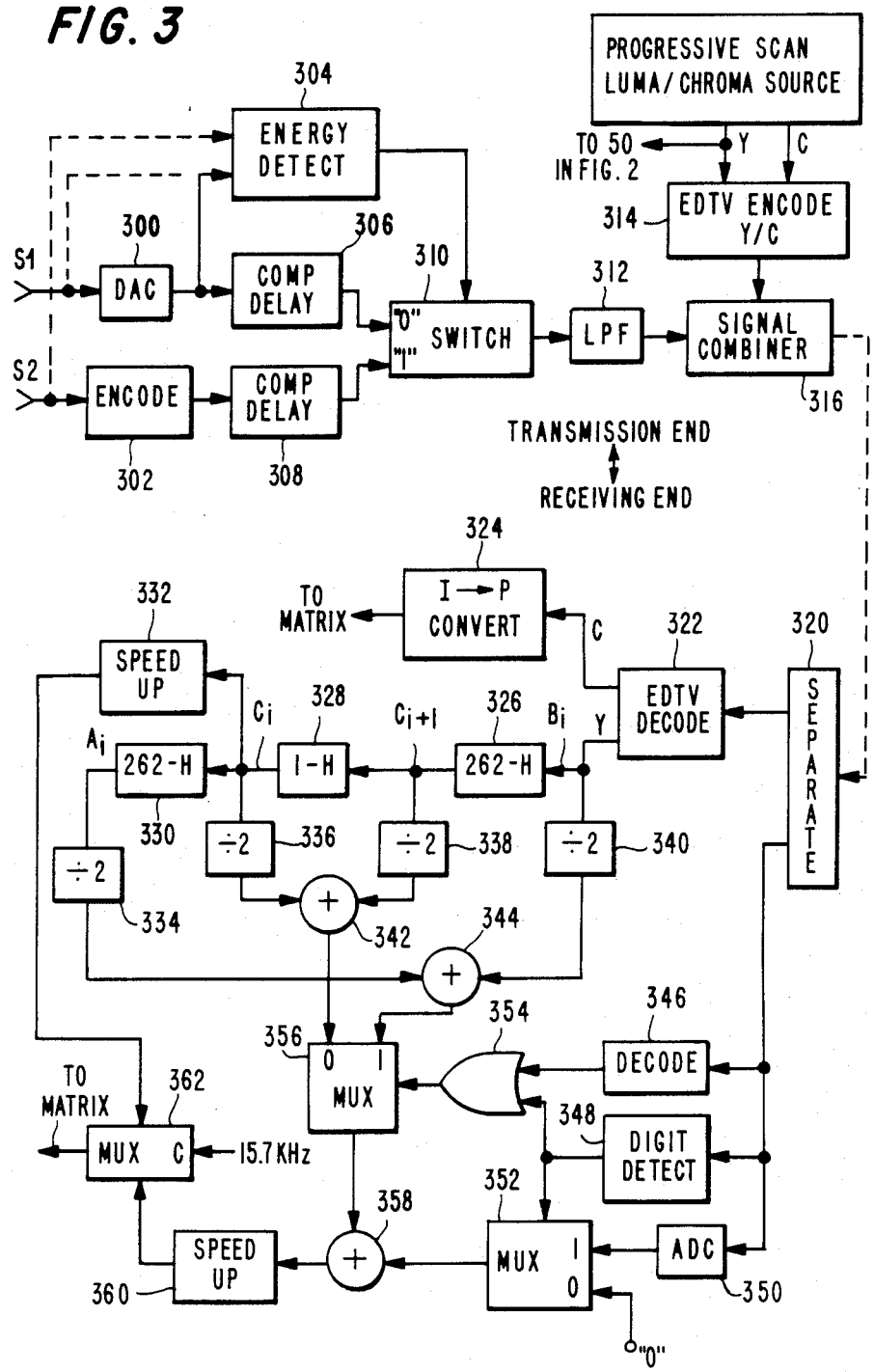
FIGS. 3 and 4 are block diagrams of alternative apparatus embodying the invention including circuitry for encoding helper signals in two formats and circuitry for decoding such signal.
Figure 4:
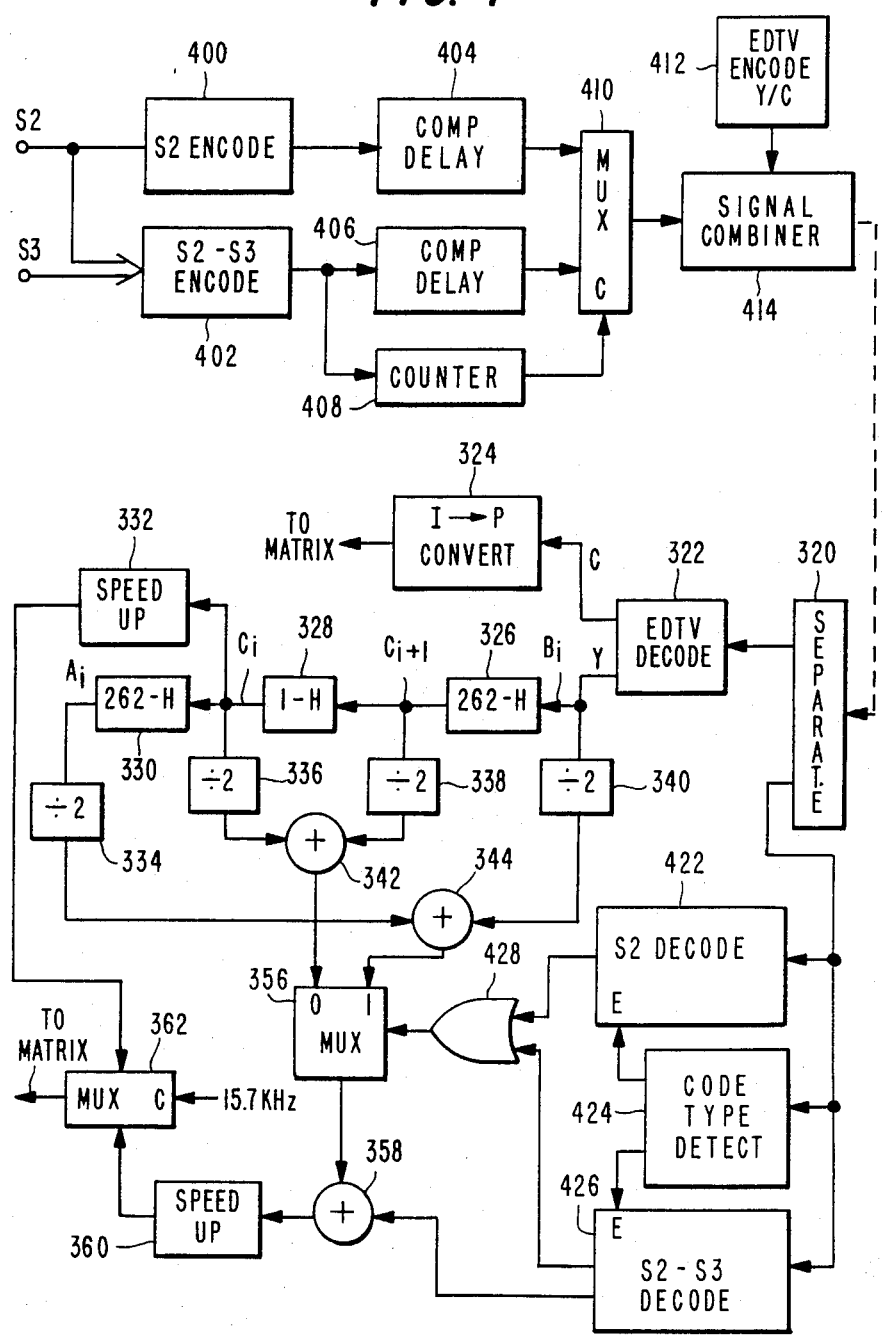

Refer now to FIG. 2 which shows circuitry for generating signals employed by the signal formatters of FIGS. 3 and 4. The FIG. 2 circuitry generates three signals, S1, S2 and S3. Signal S1 corresponds to the helper signal generated in the Isnardi et al. apparatus. In FIG. 2 a progressive scan luminance input signal, assumed to be a sampled data pulse code modulated signal, is coupled to a divide-by-two scaling circuit 26 and the cascade connection of delay elements 10, 12, 14 and 16. Delay elements 10 and 16 each delay signal by 524 horizontal line periods and delay elements 12 and 14 each delay signal by one horizontal line period. Output signal from delay element 16 is coupled to a divide-by-two scaling circuit 24. Output signals from scaling circuits 24 and 26 are coupled to respective input connections of an adder circuit 18. If the current input signal coupled to delay element 10 corresponds to line $B_i$ in FIG. 1, then the output signals from delay elements 10, 12, 14 and 16 represent lines $C_{i+1}$, $x_i$, $C_i$ and $A_i$ respectively. Consequently, adder circuit generates the sums $(A_i+B_i)/2$. These sums are coupled to the subtrahend input connection of a subtracter circuit 20. Signal representing horizontal line $x_i$ from the output of delay element 12 is coupled to the minuend input connection of the subtracter circuit 20 which generates the temporal differences $x_i - (A_i+B_i)/2$. These differences are in progressive scan format and only alternate lines are of interest. Hence the signal from subtracter 20 is applied to a progressive scan to interlace scan converter 44, which selects alternate lines of signal representing lines which are deleted and time expands them to interlace scan intervals to generate the signal S1.

Signals representing horizontal lines $C_{i+1}$ and $C_i$, from delay elements 10 and 14 respectively, are coupled to respective input connections of adder circuit 34 via divide-by-two scaling circuits 28 and 30. Adder circuit 34 generates the sums $(C_{i+1}+C_i)/2$. Output sums from adder 34 are coupled to the subtrahend input connection of a subtracter circuit 32. Signal representing lines $x_i$ is coupled to the minuend input connection of subtracter 32 which generates the vertical differences $$x_i - (C_{i+1}+C_i)/2.$$

Temporal differences from the subtracter 20 and vertical differences from the subtracter 32 are coupled to respective magnitude determining circuits 40 and 36. The magnitudes of the vertical and temporal differences are coupled to a comparator shown as a subtracter circuit 38. Comparator 38 is arranged to generate a logic one value for the magnitudes of the vertical differences being smaller than the magnitude of the temporal differences and a logic zero value for the magnitude of the temporal differences being the smaller.

Output signal from comparator 38 is coupled to the progressive scan to interlace scan converter 44, wherein the alternate lines of signal corresponding to the deleted lines are time expanded to produce signal S2. In addition, the output signal from the comparator 38 is coupled to the control input connection of the multiplexing switch 42. The temporal and vertical difference signals are coupled to respective signal input connections of switch 42, which, responsive to the comparator signal, provides the smaller of the temporal and vertical differences on e.g. a pixel by pixel basis. Output signal from the switch 42 is applied to the converter 44 wherein signal representing deleted lines is time expanded to generate signal S3.

Signal S3 which corresponds to the smaller of successive vertical and temporal differences tends to be lower in amplitude than signal S1 thus requiring lesser compression and lesser bandwidth to convey the information.

Refer now to FIG. 3 which provides an auxiliary or helper signal formatted as an analog representation of the temporal differences S1, or alternatively as an indication of whether vertical or temporal interpolations (signal S2) will produce a more accurate reconstructed line in the receiver. The criterion for selecting the helper signal format is the energy or information density of signal S1. If signal S1, when band limited to 750 kH2, will provide sufficient information to reconstruct the deleted lines in the receiver, signal S1 is transmitted. If not, then signal S2, which is a bilevel signal, is compressed using for example run length encoding or statistical (Huffman) encoding, or a combination of both and transmitted.

Signal S1 is coupled to the digital-to-analog converter (DAC) 300 where it is converted to analog form. DAC 300 may be a multiplying converter and arranged to provide amplitude compression. Output signal from DAC 300 is applied to a signal information density or energy detector 304 and to the compensating delay element 306. Delay element 306 provides a delay interval equal to the intervals over which detector 304 provides energy calculations and may equal a horizontal line interval, a field interval or a frame interval for example. Detector 304 may be of the type described in U.S. Pat. No. 4402013 entitled "Video Signal Analyzer," which counts the number of signal transitions that exceed a predetermined amplitude over a predetermined interval. If the number of transitions exceeds a preset value detector 304 provides a logic one output signal for the duration of the interval, otherwise it provides a logic zero output signal. Note detector 304 may be realized with digital apparatus in which case it will be connected ahead of the DAC 300. The output signal from detector 304 is applied to control a switching circuit or multiplexer 310. In an alternative embodiment energy detector 304 may comprise a counter coupled to count pulses of the signal S2 over a predetermined interval, and provide an output if the number of pulses exceeds a predetermined number.

Analog signal S1 from delay element 306 is coupled to a first signal input terminal of multiplexer 310, the output of which is coupled to the low pass filter 312 having a cutoff frequency of e.g. 750 kHz.

Signal S2, which indicates whether a vertically interpolated or a temporally interpolated signal will more accurately represent signals representing deleted lines is coupled to an encoder 302. Encoder 302 may include a run length encoder followed by a statistical (such as Huffman) encoder to compress the signal S2. Output signal from encoder 302 is coupled to a second signal input terminal of multiplexer 310 via a compensating delay element 308 if required.

Multiplexer 310, in response to the output signal from detector 304 couples the analog signal S1 to low pass filter 312 if the energy density of signal S1 is less than a predetermined level and couples compressed signal S2 to the low pass filter 312 if the energy density of signal S1 exceeds the predetermined level.

The signal from low pass filter 312 is applied to one input terminal of a signal combiner 316. Video signal, such as a standard NTSC signal or video signal from, for example, an Isnardi et al. type EDTV encoder, from a source 314 is coupled to a second signal input terminal of signal combiner 316. Signal combiner 316 may be of the type which quadrature modulates the respective input signals onto a picture carrier. Alternatively source 314 may be a source of HDTV signals and signal combiner 316 may include circuitry to combine the input signals in MAC format. Combined output signal from signal combiner 316 is then applied to a transmission channel such as a broadcast transmitter, cable etc.

At the receiving end of the system, received signal is applied to a signal separator 320 which performs the complementary function of combiner 316. For example if combiner 316 is a quadrature modulator, then separator 320 is a quadrature demodulator. Separator 320 separates the helper signal from the encoded video signal. The separated video signal is coupled to a video decoder 322 which provides separated luminance, Y, and chrominance, C, signal components in interlace scan format. The chrominance component, which may be represented by I and Q color difference signals, are coupled to an interlace-to-progressive scan converter 324. Converter 324 may be simple speed up circuitry which repeats each line of chrominance signal at the progressive scan rate. The chrominance output signals, from converter 324, are coupled to matrix circuitry (not shown) wherein they are combined with progressive scan luminance signal to generate R, G and B color signals to drive a display device.

The separated luminance component signal from decoder 322 is coupled to an adaptive interlace-to-progressive scan converter including the remainder of the circuitry in FIG. 3. The luminance signal is applied to the cascade coupled delay elements 326, 328 and 330 which delay signals by 262, 1 and 262 interlace scan intervals respectively. If the current signal output from decoder 322 corresponds to line $B_i$ in FIG. 1, then the output signals from delay elements 326, 328 and 330 correspond to signals from lines $C_{i+1}$, $C_i$ and $A_i$ respectively. The output signal $C_i$ from delay element 328 is applied to a speed up circuit 332 which time compresses the interlace line scan signal to a progressive line scan interval. The time compressed signal provided by speed up circuit 332 is coupled to one signal input terminal of a multiplexer 362.

The signals $C_i$ and $C_{i+1}$ from delay elements 328 and 326 are coupled, via divide-by-two weighting circuits 336 and 338, to respective input terminals of an adder circuit 342. The adder circuit 342 produces the sums $(C_i+C_{i+1})/2$ which are coupled to one signal input terminal of a multiplexer 356. The sums $(C_i+C_{i+1})/2$ correspond to vertically interpolated samples representing deleted lines.

The signals $A_i$ and $B_i$, from delay element 330 and decoder 322 are coupled, via divide-by-two weighting circuits 334 and 340, to respective input terminals of an adder circuit 344. The adder circuit 344 produces the sums $(A_i+B_i)/2$ which are coupled to a second signal input terminal of the multiplexer 356. The sums $(A_i+B_i)/2$ correspond to temporally interpolated samples representing deleted lines.

The multiplexer 356 is controlled by signal from an OR gate 354 to apply one of the vertically or temporally interpolated signals to an input terminal of an adder circuit 358. The adder 358 provides interpolated signals representing deleted lines of interlace scan duration to a speed up circuit 360 which time compresses the interpolated lines to progressive scan intervals. Time compressed signals from speed up circuit 360 are coupled to a second signal input terminal of the multiplexer 362. The multiplexer 362 is controlled by a square wave signal of interlace scan line rate to alternately couple time compressed real lines $C_i$ and time compressed interpolated lines from speed up circuit 360 to its output terminal. The luminance output signal provided by the multiplexer 362 is coupled to the aforementioned matrix circuitry to be combined with the chrominance signal from converter 324.

In the receiver circuitry so far described it is presumed that decoder 322 includes analog-to-digital converter circuitry to convert the received video signal to digital, e.g., PCM format and that the processing circuitry is of digital design.

The auxiliary or helper signal from signal separator 320 is coupled to a decoder 346, a digital detector 348 and an analog-to-digital converter (ADC) 350. The decoder 346 performs the complimentary function of the encoder 302 at the transmitting end of the system. Decoder 346 may include a statistical (e.g. Huffman) decoder followed by a run length decoder, and provides the signal S2 to one input terminal of the OR gate 354. For logic one and logic zero level values provided by the decoder 346 the multiplexer 356 is conditioned to pass the temporally and vertically interpolated values respectively.

The digital detector 348 determines whether the helper signal is the digitally compressed signal S2 or the analog helper signal S1. This may be accomplished by having the encoder 302 include a recognition signal at the beginning of each interval of encoded compressed signal. In this instance the digital detector may be a correlator designed to recognize the recognition signal and output a zero level for the following interval. For intervals in which no recognition signal is detected, the digital detector 348 provides a logic one level output signal. This function may be incorporated within the decoder 346. Alternatively the compressed signal S2, at the beginning of each interval, will of necessity include a relatively dense bit stream to initiate the decoder. This bit stream will nominally include far more transitions than the analog helper signal. The digital detector 348 may be designed to differentiate the analog and compressed signal formats by counting signal transitions at the beginning of each interval. Since the system will typically be designed to format the alternative signals in intervals of line, field or frame periods it is a straight forward process to synchronize the detector to the beginning of each interval using the horizontal or vertical synchronizing components of the video signal.

The output signal from the digital detector is coupled to a second input terminal of the OR gate 354 and to the control input of a multiplexer 352. The analog helper signal after conversion to PCM form in ADC 350 is coupled to one signal input terminal of multiplexer 352. A zero valued signal is coupled to a second input terminal of the multiplexer 352. If the received helper signal is the analog signal, digital detector 348 produces a logic one output signal which conditions the multiplexer 356 to couple the temporally interpolated values to the adder 358 and conditions the multiplexer 352 to couple the PCM helper signal from ADC 350 to a second input terminal of adder 358. In this instance, the signal provided by adder circuit 358 is the sum of the helper $(x_i - (A_i + B_i)/2)$ plus the temporally interpolated signal $(A_i + B_i)/2)$ which represent the detected lines $x_i$ exactly. Alternatively, if the received helper signal is the compressed digital signal S2, digital detector 348 provides a logic zero valued output signal which conditions the multiplexer 352 to couple a zero value to the adder 358. In this instance the multiplexer 356 is controlled by the output of decoder 346 and provides to adder 358 the vertically or temporally interpolated signal which most accurately represents the deleted lines.

The FIG. 4 circuitry generates alternative helper signals which are both formatted in compressed digital form. The all digital helper alternatives require a significantly smaller dynamic range than the analog helper and thus create significantly less likelihood of interference with the combined video signal. In the FIG. 4 circuit, elements designated with like numbers as elements in FIG. 3 are similar elements and perform similar functions.

Signal S2, which indicates which of the vertically and temporally interpolated signals will provide the more accurate representation of the deleted lines at the receiver, and which indicates which of the signal differences from subtractors 20 and 32 of FIG. 2 is smaller, is coupled to the input terminal of an encoder 400. Encoder 400 may be similar to encoder 300 in FIG. 3 and may include a run length encoder followed by a statistical encoder. Encoder 400 also includes apparatus to insert a recognition code at the beginning of each coding interval. The compressed signal S2 from encoder 400 is coupled to one signal input terminal of a multiplexing switch 410 via a compensating delay element 404.

Signal S2, which is a single bit signal, is appended as, for example, a least significant bit to samples of signal S3 which occurs as multibit samples. In the combined S2-S3 signal the S2 bit identifies if the S3 sample represents a vertical or temporal difference error. The combined S2-S3 signal is coupled to an encoder 402 which provides a digitally compressed S2-S3 signal. Encoder 402 may include a run length encoder followed by a statistical decoder. In addition, it includes apparatus to insert a recognition code at the beginning of each coding interval. The compressed signal S2-S3 is coupled to a second signal input terminal of the multiplexer 410 via compensating delay element 406.

A counter 408 is coupled to receive the compressed S2-S3 signal and counts the number of signal bits in a predetermined interval, e.g., a line interval, a field interval, etc. If the counted value exceeds a number which has been determined to exceed the channel capacity (auxiliary channel), counter 408 generates a logic one output signal for the coding interval. The output from counter 408 is coupled to control the multiplexer 410. If the number of bits of the compressed S2-S3 signal is lesser or exceeds the channel capacity, the counter conditions the multiplexer 410 to pass the compressed S2-S3 signal or the compressed S2 signal respectively. Note the delay elements 404 and 406 provide sufficient signal delays for the counter 408 to complete detection over a coding interval before the compressed signals arrive at the multiplexer 410. Note also that the signal S3, always represents the smaller of the vertical and temporal differences and thus signal S3 can be represented by fewer bits than were either only the vertical or temporal differences utilized as the error signal.

The output signal from multiplexer 410 is coupled to the signal combiner 414 wherein it is combined with video signal from e.g., an EDTV encoder 412. The signal combiner 414 may be a quadrature modulator which quadrature modulates a picture carrier with the respective input signals thereto.

At the receiving end of the system the auxiliary or helper signal provided by signal separator 320 is coupled to first and second decoders 422 and 426 and to a code type detector 424. The code type detector 424 is responsive to the inserted recognition codes and generates signals which are applied to the enable, E, terminals of the first and second decoders 422 and 426, to enable the appropriate decoder.

The decoder 422 performs the complementary function to encoder 400 and provides the signal S2 spatially correlated with the interpolated values provided by adder circuits 342 and 344. The decoded signal S2 is coupled to one input terminal of the OR gate 428 to control the multiplexer 356 when decoder 422 is enabled.

The decoder 426 performs the complementary function to encoder 402 and provides the combined signal S2-S3 spatially correlated with the interpolated values from adder circuits 342 and 344. The signal S2 bit, of the combined decoded S2-S3 signal, is coupled to a second input terminal of the OR gate 428 to control the multiplexer 356 when decoder 426 is enabled. The bits representing signal S3 of the decoded S2-S3 signal are coupled to the adder 358 when decoder 426 is enabled and a zero value is coupled to adder 358 when decoder 426 is disabled.

If the received helper signal corresponds to the signal S2 format, the decoder 422 conditions (with signal S2) the multiplexer 356 to pass the vertical or temporal interpolated signal which will most closely represent the deleted lines. This signal is coupled unchanged, via adder 358, to the speed up circuitry 360. Alternatively, if the received helper signal corresponds to the S2-S3 signal format, the S2 signal from decoder 426 conditions the multiplexer 356 to pass the vertically or temporally interpolated signal which most closely represents the deleted lines to adder 358. The error signal S3 from decoder 426 is added in adder 358 to the signal provided by the multiplexer 356. The sums provided by adder 358, in this instance, exactly represent the signals of the deleted lines.

In the foregoing description and figures, compensating delay elements have been omitted to avoid confusion. For example, if the video decoder 322 is an EDTV decoder of the Isnardi et al. type, it may be necessary to include a compensating delay in the helper signal path to correlate the helper and video signals. In addition, it may be necessary to include compensating delays between the signal separator 320 and the decoders 422 and 426 to provide the code type detector 424 time to identify the signal format before the helper signal is applied to the respective decoder. In addition, since the signal $c_i$ from delay element 328 and the generated signal $x_i$ from adder occur substantially concurrently, the time compressed versions of signals $c_i$ and $x_i$ will occur concurrently. Therefore an offset delay of one half an interlace scan line interval must be provided between circuit 360 and multiplexer 362. However, one skilled in the art of circuit design will readily appreciate where compensating delays are required and be able to include them.

What is claimed is:

1. A system for generating a television signal comprising:
    a source of video signal information;
    means responsive to said video signal information for providing an encoded video signal, said encoded video signal excluding a portion of said video signal information;
    means responsive to said video signal information for providing a first auxiliary signal conveying information related to said excluded portion of said video signal information, in a first signal format;
    means responsive to said video signal information for providing a second auxiliary signal conveying information related to said excluded portion of said video signal information, in a second signal format;
    means responsive to one of said first and second auxiliary signals for selectively providing said first auxiliary signal or said second auxiliary signal, as an auxiliary output signal, depending on the information density of said one of said first and second auxiliary signals; and
    means for combining said auxiliary output signal and said encoded video signal to produce said television signal.

2. The system set forth in claim 1 wherein said first auxiliary signal is an analog signal and said second auxiliary signal is a digital signal.

3. The system set forth in claim 1 wherein said source provides progressive scan luminance signal and said means for providing encoded video signal provides interlace scan video signal and wherein said means for providing a first auxiliary signal includes:
    delay means responsive to said progressive scan luminance signal for concurrently providing first, second and third luminance signals representing temporally adjacent horizontal lines of luminance signal from three successive field intervals; and
    means for combining the first, second and third luminance signals in the relation $(x_i-(A_i+B_i)/2)$ to generate a temporal difference signal representing said first auxiliary signal, where $B_i$, $x_i$ and $A_i$ represent the amplitudes of the first, second and third luminance signals respectively.

4. The system set forth in claim 3 wherein said delay means includes means for concurrently providing fourth and fifth luminance signals with said first, second and third luminance signals, said fourth and fifth luminance signals representing horizontal lines, respectively, vertically disposed above and below a horizontal line represented by said second luminance signal, and wherein said means for providing said second auxiliary signal includes:
    means for combining said second, fourth and fifth signals in the relationship $(x_i-(C_i+C_{i+1})/2)$ to produce a vertical difference signal, where $C_i$ and $C_{i+1}$ represent the amplitudes of the fourth and fifth luminance signals respectively; and
    means responsive to said first auxiliary signal and said vertical difference signal for producing said second auxiliary signal exhibiting first and second states when the magnitude of the first auxiliary signal is greater and lesser than the magnitude of the vertical difference signal respectively.

5. The system set forth in claim 4 wherein said means for providing said second auxiliary signal further includes means for compressing said second auxiliary signal exhibiting first and second states.

6. The system set forth in claim 1 wherein said source provides a progressive scan luminance signal and said means for providing encoded video signal provides interlace scan video signals and wherein said means for providing said first auxiliary signal includes:
    means responsive to said progressive scan luminance signal for generating a temporally difference signal representing the difference between progressive scan luminance signal representing a first horizontal line in a first field and the average of progressive scan luminance signal from temporally adjacent second and third horizontal lines in second and third fields, respectively, disposed before and after said first field;
    means responsive to said progressive scan luminance signal for generating a vertical difference signal representing the difference between said first horizontal line and the average of progressive scan luminance signals representing fourth and fifth horizontal lines in said first field and vertically disposed on either side of said first horizontal line;
    means for comparing said vertical and temporal difference signals for providing said first auxiliary signal exhibiting first and second states when the magnitude of said temporal difference signal is greater and lesser than the magnitude or said vertical difference signal respectively; and
    wherein said means for providing a second auxiliary signal includes means responsive to said first auxiliary signal for selectively providing, as said second auxiliary signal, the vertical or temporally difference signal having the smaller magnitude.

7. The system set forth in claim 6 wherein said means for providing said first auxiliary signal further includes means for compressing said first auxiliary signal exhibiting first and second states; and wherein said means for providing said second auxiliary signal further includes means for compressing said selectively provided vertical and temporally difference signals.

8. The system set forth in claim 6 wherein said first auxiliary signal is in single bit digital sample format and said vertical and temporally difference signals are in multibit digital sample format, and said means for providing said second auxiliary signal further includes means for appending said single bit digital samples of said first auxiliary signal to respective corresponding multibit samples of said selected vertical or temporally difference signal.

9. The system set forth in claim 1 further including a receiver, for receiving said television signal, comprising:
- separating means, responsive to received television signal, for separating said encoded video signal and said auxiliary output signal;
- video signal decoding means, responsive to said encoded video signal for generating an interlace scan luminance signal;
- auxiliary signal decoding means, responsive to separated auxiliary output signal, for recognizing said first and second auxiliary signals and providing a decoded auxiliary signal; and
- means, responsive to said interlace scan luminance signal and said decoded auxiliary signal for generating a progressive scan luminance signal.

10. A video signal processing system for processing a television signal including an encoded video signal having luminance and chrominance components in interlace scan format and including an auxiliary signal transmitted in alternative signal formats, said system comprising:
- a source of said television signal;
- separating means responsive to said television signal for providing separated encoded video and auxiliary signals;
- video signal decoding means responsive to said separated encoded video signal for providing an interlace scan luminance signal;
- auxiliary signal decoding means responsive to said separated auxiliary signal, for decoding said alternative auxiliary signal formats and providing a decoded auxiliary signal; and
- a progressive scan processor, responsive to said interlace scan luminance signal and said decoded auxiliary signal for generating a progressive scan luminance signal.

11. The processing system set forth in claim 10 wherein said alternative signal formats of said auxiliary signal include a first signal format representing a bistate signal which indicates whether said progressive scan processing means will generate additional scan lines more accurately by vertical or temporally interpolation and a second signal format includes an analog signal representing differences between the actual signal values of said additional lines and temporally interpolated lines, and wherein said auxiliary signal decoding means includes:
- means, responsive to said separated auxiliary signal, for detecting said first and second alternative signal formats; and
- means, responsive to said detecting means and said separated auxiliary signal, for conditioning said auxiliary signal for application to said progressive scan processing means.

12. The system set forth in claim 11 wherein said progressive scan processing means includes:
- interpolating means, responsive to said interlace scan luminance signal for concurrently providing vertical and temporal estimates of signal representing additional horizontal lines;
- multiplexing means, responsive to a control signal for selectively providing either said vertical or said temporal estimates;
- signal combining means having a first input terminal coupled to said multiplexing means, an output terminal and a second input terminal;
- signal speed up circuitry, coupled to the output terminal of said signal combining means for time compressing interlace scan line intervals of signal to progressive scan line intervals of signal; and
wherein said means for conditioning said auxiliary signal, includes:
- means responsive to said detecting means for selectively coupling signal representing said second signal format or a zero value signal to the second input terminal of said signal combining means when the second and first signal formats are detected respectively, and providing a control signal to said multiplexing means to condition said multiplexing means to provide temporally estimates when said second signal format is detected; and
- means responsive to said separated auxiliary signal, for providing as a control signal to said multiplexing means, signal representing said first signal format when said first signal format is detected.

13. The processing system set forth in claim 10 wherein said alternative signal formats of said auxiliary signal include a first signal format representing a bistate signal which indicates whether said progressive scan processing means will generate additional scan lines more accurately by vertical or temporally interpolation, and a second signal format includes a signal representing samples of the smaller of vertical and temporally differences between actual signal values of said additional lines and corresponding vertically and temporally interpolated lines with said bistate signal appended to said samples to indicate whether the sample is a vertical or temporal difference, and wherein said auxiliary signal decoding means includes:
- means responsive to said separated auxiliary signal for detecting said first and second alternative signal formats; and
- means responsive to said detecting means and said separated auxiliary signal, for conditioning said separated auxiliary signal for application to said progressive scan processing means.

14. The system set forth in claim 13 wherein said progressive scan processing means includes:
- interpolating means, responsive to said interlace scan luminance signal for concurrently providing vertical and temporal estimates of signal representing additional horizontal lines;
- multiplexing means, responsive to a control signal for selectively providing either said vertical or said temporal estimates;
- signal combining means having a first input terminal coupled to said multiplexing means, having an output terminal and a second input terminal;
- speed up circuitry coupled to the output terminal of said signal combining means for time compressing interlace scan intervals of signal to progressive scan intervals of signal; and wherein said means for conditioning said auxiliary signal includes:

means responsive to said detecting means and said separated auxiliary signal for coupling a signal representing said first signal format to said multiplexing means as said control signal and applying a zero value to the second input terminal of said signal combining means when said first signal format is detected; and means responsive to said detecting means and said separated auxiliary signal, for separating said appended bistate signal from said vertical and temporal difference samples of said second signal format and coupling a signal representing said bistate signal, as a control signal to said multiplexing means, and coupling signal representing said vertical and temporal samples to the second input terminal of said signal combining means, when said second signal format is detected.

* * * * *

UNITED STATES PATENT AND TRADEMARK OFFICE
CERTIFICATE OF CORRECTION

PATENT NO. : 4,866,509

DATED : September 12, 1989

INVENTOR(S) : Allan A. Guida

It is certified that error appears in the above-identified patent and that said Letters Patent is hereby corrected as shown below:

Col. 1, line 51, insert a period (.) after "signal".
Col. 1, line 52, insert a period (.) after "redundancy".

Col. 7, line 35, after "which" insert --sum--.
Col. 11, line 6, change "temporally" to --temporal--.
Col. 11, line 56, change "temporally" to --temporal--.
Col. 12, line 26, change "temporally" to --temporal--.
Col. 12, line 37, change "temporally" to --temporal--.
Col. 12, line 39, change "temporally" to --temporal--.

Signed and Sealed this

Thirteenth Day of November, 1990

Attest:

HARRY F. MANBECK, JR.

*Attesting Officer*  *Commissioner of Patents and Trademarks*